US012634738B2

(12) United States Patent
Shrivastava et al.

(10) Patent No.: US 12,634,738 B2
(45) Date of Patent: May 19, 2026

(54) METHOD AND SYSTEM FOR MEASUREMENT OPERATION FOR MULTICAST AND BROADCAST SERVICES IN 5G

(71) Applicant: Samsung Electronics Co., Ltd., Suwon-si (KR)

(72) Inventors: Vinay Kumar Shrivastava, Bangalore (IN); Diwakar Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 18/272,511

(22) PCT Filed: Jan. 14, 2022

(86) PCT No.: PCT/KR2022/000699
§ 371 (c)(1),
(2) Date: Jul. 14, 2023

(87) PCT Pub. No.: WO2022/154552
PCT Pub. Date: Jul. 21, 2022

(65) Prior Publication Data
US 2024/0323733 A1 Sep. 26, 2024

(30) Foreign Application Priority Data

Jan. 15, 2021 (IN) .............................. 202141001889
Jan. 3, 2022 (IN) .............................. 2021 41001889

(51) Int. Cl.
*H04W 24/08* (2009.01)
*H04W 24/10* (2009.01)
(Continued)

(52) U.S. Cl.
CPC ........... *H04W 24/10* (2013.01); *H04W 24/08* (2013.01); *H04W 72/0453* (2013.01);
(Continued)

(58) Field of Classification Search
CPC ....... H04B 17/0082–409; H04L 5/0001–0098; H04W 4/06–10;
(Continued)

(56) References Cited

U.S. PATENT DOCUMENTS 10,517,026 B2 12/2019 Chai et al.
2017/0303157 A1 10/2017 Siomina et al.
(Continued)

FOREIGN PATENT DOCUMENTS

CN 103188724 B 7/2016

OTHER PUBLICATIONS

CATT, Discussion on reliability improvement mechanism for RRC_ Connected UEs in MBS, R1-2007836, 3GPP TSG RAN WG1 #103-e, e-Meeting, Nov. 1, 2020.
(Continued)

*Primary Examiner* — Timothy J Weidner
(74) *Attorney, Agent, or Firm* — Jefferson IP Law, LLP

(57) ABSTRACT

In an embodiment, a method for performing a measurement operation for Multicast and Broadcast Services (MBS) in 5G is disclosed. The method includes receiving at a User Equipment (UE), a message from a network for configuring the UE comprising at least one of one or more configurations, and one or more reference signals of one or more of a Bandwidth Part (BWP) or a Common Frequency Resource (CFR) associated with one of a unicast and the MBS. The method includes performing a measurement operation for the MBS reception for the one or more configurations based on the one or more reference signals associated with one or more of the unicast and the MBS. The method further includes generating a measurement report associated with the MBS reception based on a measurement of the MBS.

16 Claims, 15 Drawing Sheets

(51) Int. Cl.

| | |
|---|---|
| *H04W 72/0453* | (2023.01) |
| *H04W 72/30* | (2023.01) |
| *H04W 76/28* | (2018.01) |
| *H04W 76/40* | (2018.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ........... *H04W 72/30* (2023.01); *H04W 76/28* (2018.02); *H04W 76/40* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 24/02–10; H04W 36/0005–385; H04W 72/02–569; H04W 76/10–50; H04W 84/02–16; H04W 88/02–12; H04W 92/02–04; H04W 92/10; Y02D 30/70
See application file for complete search history.

(56) References Cited

U.S. PATENT DOCUMENTS

| | | |
|---|---|---|
| 2018/0192255 A1 | 7/2018 | Guo et al. |
| 2019/0053015 A1 | 2/2019 | Schmidt et al. |
| 2019/0166580 A1 | 5/2019 | Prasad et al. |
| 2021/0014032 A1 | 1/2021 | Loehr et al. |
| 2021/0185566 A1* | 6/2021 | Zhu ...................... H04W 24/10 |
| 2022/0210766 A1* | 6/2022 | Liu ...................... H04W 24/08 |
| 2024/0064591 A1* | 2/2024 | Babaei ............. H04W 36/0058 |

OTHER PUBLICATIONS

Qualcomm Incorporated, Views on reliability enhancement for Multicast RRC Connected UEs, R1-2009275, 3GPP TSG RAN WG1 #103-e, e-Meeting, Nov. 1, 2020.

Extended European Search Report dated May 21, 2024, issued in European Patent Application No. 22739745.2.

CMCC, Summary#2 on NR Multicast and Broadcast Services, R1-2007235, 3GPP TSG RAN WG1 #102-e, e-Meeting, Aug. 27, 2020.

Huawei et al., Resource configuration and group scheduling for RRC_Connected UEs, R1-2007562, 3GPP TSG RAN WG1 Meeting #103-e, E-meeting, Nov. 1, 2020.

Indian Office Action dated Aug. 4, 2022, issued in Indian Patent Application No. 202141001889.

Indian Notice of Hearing dated Feb. 27, 2026, issued in Indian Patent Application No. 202141001889.

* cited by examiner

FIG. 1

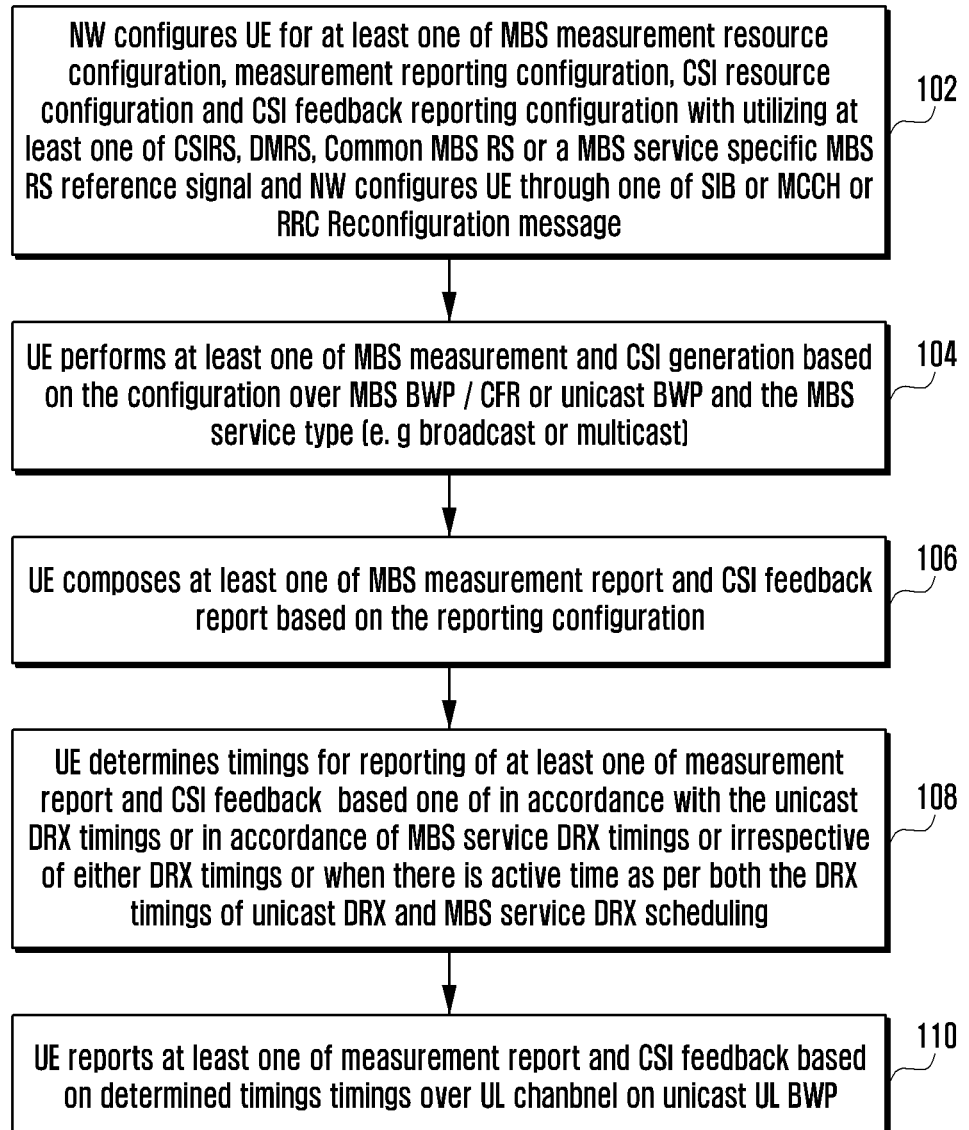

100

NW configures UE for at least one of MBS measurement resource configuration, measurement reporting configuration, CSI resource configuration and CSI feedback reporting configuration with utilizing at least one of CSIRS, DMRS, Common MBS RS or a MBS service specific MBS RS reference signal and NW configures UE through one of SIB or MCCH or RRC Reconfiguration message  —102

UE performs at least one of MBS measurement and CSI generation based on the configuration over MBS BWP / CFR or unicast BWP and the MBS service type (e. g broadcast or multicast)  —104

UE composes at least one of MBS measurement report and CSI feedback report based on the reporting configuration  —106

UE determines timings for reporting of at least one of measurement report and CSI feedback based one of in accordance with the unicast DRX timings or in accordance of MBS service DRX timings or irrespective of either DRX timings or when there is active time as per both the DRX timings of unicast DRX and MBS service DRX scheduling  —108

UE reports at least one of measurement report and CSI feedback based on determined timings timings over UL chanbnel on unicast UL BWP  —110

FIG. 2

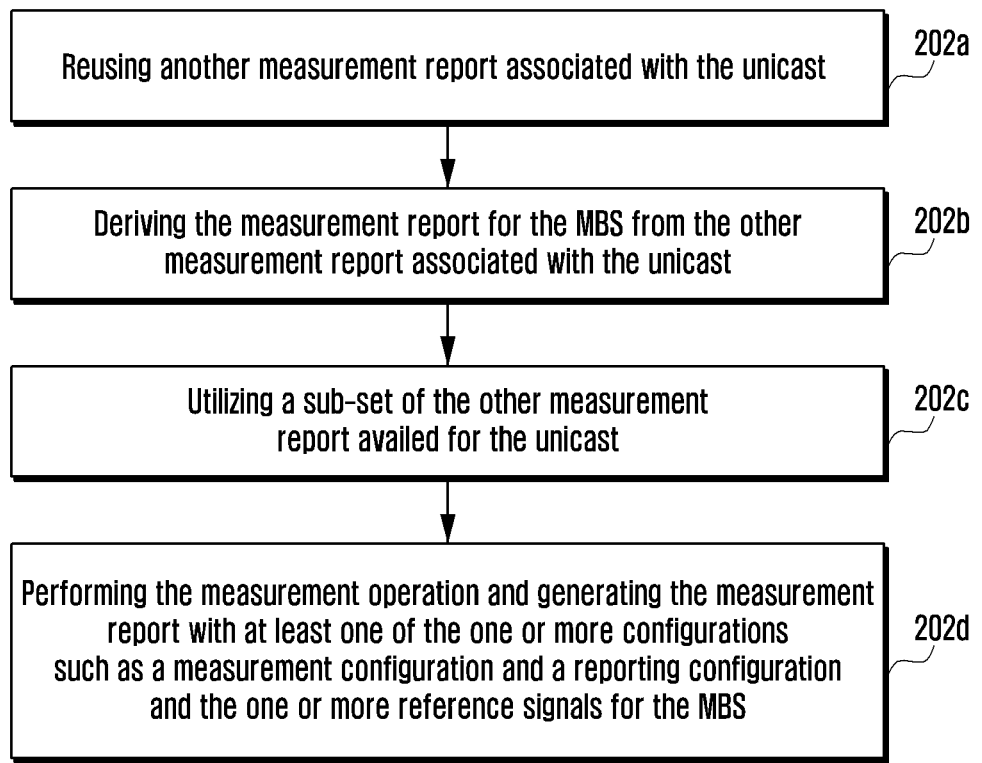

200

Reusing another measurement report associated with the unicast　　202a

Deriving the measurement report for the MBS from the other measurement report associated with the unicast　　202b Utilizing a sub-set of the other measurement report availed for the unicast　　202c Performing the measurement operation and generating the measurement report with at least one of the one or more configurations such as a measurement configuration and a reporting configuration and the one or more reference signals for the MBS　　202d

FIG. 3

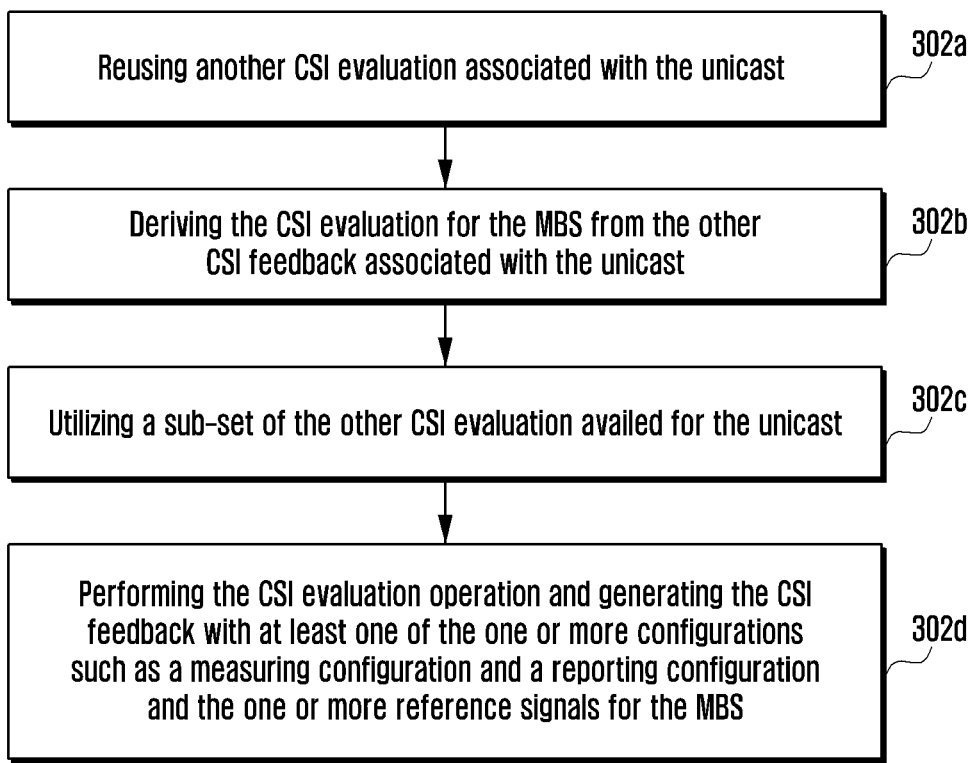

300

Reusing another CSI evaluation associated with the unicast — 302a

Deriving the CSI evaluation for the MBS from the other CSI feedback associated with the unicast — 302b Utilizing a sub-set of the other CSI evaluation availed for the unicast — 302c Performing the CSI evaluation operation and generating the CSI feedback with at least one of the one or more configurations such as a measuring configuration and a reporting configuration and the one or more reference signals for the MBS — 302d

500

| Transmitting a measurement report to the network from the UE | 502 |

↓

| Receiving the MBS from the network on at least one of the MBS BWP and the CFR associated with an activated unicast downlink (DL) BWP | 504 |

↓

| Informing the network about a reception of the MBS over the BWP or the CFR associated with the MBS with the BWP associated with the unicast | 506 |

600

Transmitting a message for configuring the UE    602

Receiving at the network one of a mobility measurement
report and a CSI feedback associated with the MBS reception to
the network    604

700

800

Unicast BWP
X

MBS BWP / Freq
Resource
Y

900

1300

<u>1400</u>

METHOD AND SYSTEM FOR MEASUREMENT OPERATION FOR MULTICAST AND BROADCAST SERVICES IN 5G

TECHNICAL FIELD

The present disclosure, in general, relates to wireless communication, in particular, relates to systems and methods for performing a measurement operation for Multicast and Broadcast Services (MBS) in 5G.

BACKGROUND ART

To meet the increasing demand for wireless data traffic since the deployment of a 4th generation (4G) communication systems, efforts have been made to develop an improved 5th generation (5G) or pre-5G communication system. Therefore, the 5G or pre-5G communication system is also called a "beyond 4G network" communication system or a "post long term evolution (LTE) System."

Implementation of the 5G communication system in ultra-high frequency (mmWave) bands, such as, for example, 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multipoints (COMP), reception-end interference cancellation, and the like.

In addition, in the 5G system, hybrid FSK and QAM modulation (FQAM) and sliding window superposition coding (SWSC), as advanced coding modulation (ACM) systems, and filter bank multicarrier (FBMC), non-orthogonal multiple access (NOMA), and sparse code multiple access (SCMA), as advanced access technologies, have been developed.

In the 5G system, it has been considered to support various services in comparison with the existing 4G system. For example, the most representative services may be enhanced mobile broadband (eMBB), ultra-reliable low-latency communication (URLLC), massive machine type communication (mMTC), evolved multimedia broadcast/multicast service, and the like. Further, a system providing the URLLC service may be called a URLLC system, and a system providing the eMBB service may be called an eMBB system. Further, the terms "service" and "system" may be interchangeably used.

Among them, the URLLC service is a service that is newly considered in the 5G system in contrast with the existing 4G system, and it should satisfy ultra-high reliability (e.g., packet error rate of about 105) and low latency (e.g., about 0.5 msec) requirements in comparison with other services. In order to satisfy such severe requirements, the URLLC service may require an application of a transmit time interval (TTI) that is shorter than that of the eMBB service, and various operating schemes using this are under consideration.

On the other hand, the Internet, which is a human-centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as sensing technology, wired/wireless communication and network infrastructure, service interface technology, and "security technology," have been demanded for IoT implementation, and thus technologies, such as a sensor network, machine-to-machine (M2M) communication, machine type communication (MTC) for a connection between things, have recently been researched.

An IoT environment may provide intelligent Internet technology (IT) services that create a new value for human life by collecting and analyzing data generated among connected things. IoT may be applied in a variety of contexts, including smart homes, smart buildings, smart cities, smart cars or connected cars, smart grids, health care, smart appliances, and advanced medical services, through convergence and combination between existing information technology (IT) and various industrial applications.

Accordingly, various attempts have been made to apply the 5G communication system to IoT networks. For example, technologies of sensor network, machine to machine (M2M) communication, and machine type communication (MTC) have been implemented by techniques for beamforming, MIMO, and array antennas, which correspond to the 5G communication technology. As the big data processing technology as described above, application of a cloud radio access network (cloud RAN) would be an example of convergence between the 5G technology and the IoT technology.

DISCLOSURE OF INVENTION

Technical Problem

An embodiment proposes a designing an architecture for the network as well as the User Equipment (UE) for a 5G Multicast Broadcast Services (MBS).

An embodiment proposes a method and a system for performing a measurement operation for the MBS in 5G system.

The technical issues to be addressed in the disclosure are not limited to the above described technical issues, and other technical issues that have not been mentioned may be clearly understood by those skilled in the art from the following description.

Solution to Problem

This summary is provided to introduce a selection of concepts, in a simplified format, that are further described in the detailed description of the invention. This summary is neither intended to identify key or essential inventive concepts of the invention and nor is it intended for determining the scope of the invention.

In accordance with some example embodiments of the present subject matter, a method implemented in a User Equipment (UE) for performing a measurement operation for Multicast and Broadcast Services (MBS) in 5G is disclosed. The method includes receiving at a User Equipment (UE), a message from a network for configuring the UE comprising at least one of one or more configurations, and one or more reference signals of one or more of a Bandwidth Part (BWP) or a Common Frequency Resource (CFR) associated with one of a unicast and the MBS. The method includes performing a measurement operation for the MBS reception for the one or more configurations based on the one or more reference signals associated with one or more of the unicast and the MBS. The method further includes generating a measurement report associated with the MBS reception based on a measurement of the MBS.

In accordance with some example embodiments of the present subject matter, a system, implemented in a User Equipment (UE) for performing a measurement operation for Multicast and Broadcast Services (MBS) in 5G is disclosed. The system includes receiving at a User Equipment (UE) through a communication unit, a message from a network for configuring the UE comprising at least one of one or more configurations, and one or more reference signals of one or more of a Bandwidth Part (BWP) or a Common Frequency Resource (CFR) associated with one of a unicast and the MBS. The system includes performing, by a controller, a measurement operation for the MBS reception for the one or more configurations based on the one or more reference signals associated with one or more of the unicast and the MBS. The system further includes generating, by the controller, a measurement report associated with the MBS reception based on a measurement of the MBS.

Advantageous Effects of Invention

According to an embodiment of the disclosure, a designing an architecture for the network as well as the User Equipment (UE) for a 5G Multicast Broadcast Services (MBS) is proposed.

According to an embodiment of the disclosure, a method and a system for performing a measurement operation for the MBS in 5G system is proposed.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 1 illustrates an operational flow diagram depicting a process for performing a measurement operation for MBS in 5G, in accordance with an embodiment of the present subject matter;

FIG. 2 illustrates an operational flow diagram depicting a process for measuring the MBS, in accordance with an embodiment of the present subject matter;

FIG. 3 illustrates an operational flow diagram depicting a process for performing a CSI evaluation, in accordance with an embodiment of the present subject matter;

Figure 4:
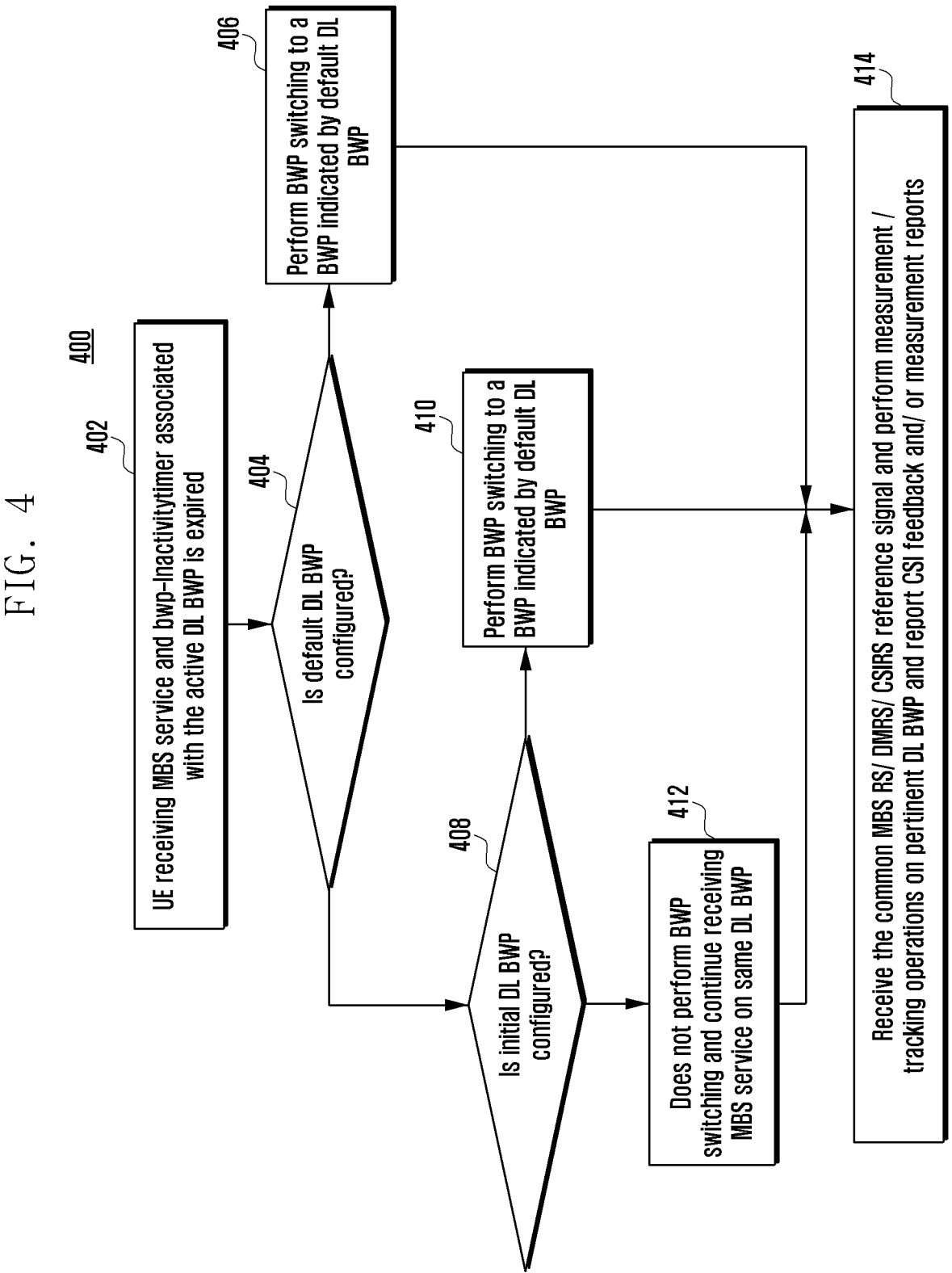
FIG. 4 illustrates an operational flow diagram depicting a process for receiving a message transmitted by a network for configuring a UE and performing measurement by the UE, in accordance with an embodiment of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

MODE FOR THE INVENTION

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

5G NR is targeting support for Multicast and Broadcast services in its Release 17 version of specification being prepared by 3GPP. In legacy MBMS (Multimedia Broadcast Multicast Services were supported in LTE 4G (Long Term Evolution) wireless systems. However, the architecture and the requirements of 5G Multicast Broadcast Services (MBS) could be very different and there is an effort in the direction of designing the architecture for the network as well as the User Equipment (UE) is in progress.

Specifically, multicast services refer to services being transmitted and availed by a set of UEs registered to a group e.g. MCPTT (Mission Critical Push-To-Talk) service. Broadcast services refer to services being transmitted and available to all the UEs in a specific coverage area where broadcast is performed and typically, UE may not need to be registered. Therefore, effectively, both multicast and broadcast services are PTM (Point-To-MultiPoint) services as there is one transmitter and multiple recipient of contents. It is also possible to provide multicast and broadcast services in a PTP (Point-to-Point) manner, wherein there are multiple PTP connections to share the same MBS with multiple recipients. Apart from Multicast and Broadcast services, there are another category of services termed as Unicast services which is meant for one recipient only for this is one to one dedicated connection between transmitter and receiver.

It is possible to have PTM bearer, PTP bearer or a combination of PTM and PTP bearer to carry the same MBS. Combination of PTM and PTP bearer may provide a lot of features with respect to increased reliability of reception of MBS packets, efficient switching between these two modes of reception when needed e.g. because of mobility, network loading conditions or based on the user request density for the reception of the MBS and accordingly network may decide the delivery modes and/or switching across. We refer to a bearer configuration which has possibly both legs of PTM and PTP termed as MBS split bearer.

Thus, there is a need for a solution that overcomes the above deficiencies.

FIG. 1 illustrates an operational flow diagram 100 depicting a process for performing a measurement operation for MBS in 5G, in accordance with an embodiment of the present subject matter. In an embodiment, the process for performing the measurement operation may be implemented in the UE. Examples of the UE may include, but are not limited to, a smartphone, a laptop, a Personal Computer (PC), a tablet, a connected car and a Television (TV). In an embodiment, the UE may be configured to operate in a New Radio (NR). Further, the UE may be configured to communicate with a network which may include but not limited to LTE, 5G, 5G Advanced, Wireless LAN (Wifi) and 6G. In an embodiment, the measurement operation may include configuration of one or more measurement resources, one or more BWP aspects for MBS operation and associated signaling and operations, a Channel State Information (CSI) feedback reporting, a Hybrid Automatic Repeat Request (HARQ) feedback, a measurement reporting, timings, and mobility aspects.

Continuing with the above embodiment, the process may include receiving (step 102) at a User Equipment (UE), a message from a network for configuring the UE. In an embodiment, the UE may be configured by the network for receiving the MBS from the network. In an embodiment, the message may include at least one of one or more configurations, and one or more reference signals of one or more of a Bandwidth Part (BWP) or a Common Frequency Resource (CFR). In an embodiment, the one or more of a Bandwidth Part (BWP) or a Common Frequency Resource (CFR) may be associated with one of a unicast and the MBS. In an embodiment, the message may be one of a System Information Block (SIB) message, a MBS Control Channel (MCCH) message and a Radio Resource Configuration (RRC) reconfiguration message.

In an embodiment, the one or more configurations may include a MBS measurement resource configuration, a MBS measurement reporting configuration, a MBS Channel State Information (CSI) resource configuration, and a MBS CSI feedback reporting configuration. In an embodiment, the one or more reference signals may include at least one of a Channel State Information Reference Signal (CSIRS), a Demodulation Reference Signal (DMRS), and a common MBS reference signal. In an embodiment, the one or more reference signals may further be considered for L1-Reference Signal Received Power (RSRP) measurements, L3 mobility measurements, CSI (Channel state indicator) feedback, demodulation, beam management, link adaptation or tracking purposes.

In an embodiment, the CSIRS utilized for the measurement by the UE may be wide-band and provided/measured across a bandwidth beyond allocated frequency resources for the UE. Further, the DMRS may be used for the demodulation purpose and the DMRS may be provided/measured in one or more allocated resource blocks (PRBs). A DMRS reference signal configuration may also be dependent on a number of services use-cases. Examples of the number of services use cases may include an Enhanced Mobility Broadband (eMBB)/Ultra Reliable Low Latency Communication (URLLC), a UE mobility. Further, the DMRS reference signal configuration may include a number of configurations such as a single symbol, a dual symbol, a mapping type A and a mapping type B.

In an embodiment, the CSIRS may be a new CSIRS reference signal in the MBS BWP or frequency resource or an extended unicast CSIRS reference signal in the MBS BWP or the CFR. In an embodiment, a group-common Physical Downlink Control Channel (PDCCH) and group-common PDSCH channels may be used in the MBS BWP or the CFR, a group common scrambling identity may be used for the one or more reference signals. In an embodiment, one of a common CSIRS and an independent CSIRS may be utilized for the physical channels like PDCCH and PDSCH.

In an embodiment, the DMRS with one common configuration type in the MBS BWP or the CFR may be utilized. In an embodiment, one of a common DMRS and an independent DMRS may be for the physical channels such as the PDCCH and the PDSCH. In an embodiment, a common MBS reference signal (MBS RS) may be provided in the MBS BWP or the CFR.

In an embodiment, the MBS RS may be provided in the allocated frequency-time resources for the UEs. In an embodiment, the MBS RS may be provided in the MBS BWP or the CFR as per the specific MBS or a UE-group requirement such as a V2X service, a high reliability service, a high mobility UE. The MBS RS configuration may also be specifically designed to be provided in a time-frequency such as a RS density, a placement, and a configuration. Further, a specific UE may utilize the MBS RS present in the allocated time-frequency resources for a number of specific services received by the UE. Further, as a Group-Radio Network Temporary Identifier (G-RNTI) for the UE may be as per specific MBS, the G-RNTI may also be used for a scrambling purpose in the allocated time-frequency resources for the specific MBS in the MBS BWP or the CFR. Further, the reference signal may be allocated as per the specific MBS in accordance with a MBS DRX configuration and timings. In an alternative embodiment, the MBS RS may be common and alike across the MBS BWP or the CFR frequency resource. A common or independent MBS RS reference signal may be utilized for the physical channels such as the PDCCH and the PDSCH.

In response to receiving the message at the UE, the process may include performing (step 104) a measurement operation for the MBS reception for the one or more configurations based on the one or more reference signals associated with one or more of the unicast and the MBS. In an embodiment, the measurement operation may be at least one of a mobility measurement and a CSI evaluation.

Continuing with the above embodiment, upon performing the measurement operation for generating the measurement report, the process may proceed towards generating (step 106) a measurement report associated with the MBS reception based on a measurement of the MBS. In an embodiment, the measurement report may be at least one of a mobility measurement report and a CSI feedback. In an embodiment, the mobility measurement report may be based on performing the mobility measurement and the CSI feedback may be based on the CSI evaluation performed above.

Subsequent to generation of the measurement report, the process may proceed towards determining (step 108) a timing associated with transmitting the measurement report. In an embodiment, the timing may be determined based on one or more of a unicast Discontinuous Reception (DRX) timing, a MBS DRX timing, a common time between the unicast DRX timing and the MBS DRX timing and a time irrespective of the unicast DRX timing and the MBS DRX timing. In an embodiment, where it is determined that the UE is configured with a unicast DRX, the UE may not be required to perform a measurement of CSIRS resources in unicast BWP other than during the active time for measurements based on CSIRS resource configuration for unicast BWP and the UE is required to perform a measurement of at least one of the CSIRS, the DMRS and the common RS (MBS RS) in the MBS BWP or the CFR, such that a MBS active time is applicable for receiving a specific MBS by the UE in the MBS BWP or CFR. In an embodiment, the CSI feedback may also be generated in the unicast BWP other than during the active time for measurements based on CSIRS resource configuration for unicast BWP and the UE is required to perform a measurement of at least one of the CSIRS, the DMRS and the common RS (MBS RS) in the MBS BWP or the CFR, such that a MBS active time is applicable for receiving a specific MBS by the UE in the MBS BWP or CFR.

In another embodiment of the invention, if the UE is configured with DRX and the unicast DRX cycle in use is larger than 80 ms, the CSIRS resources are available at a time other than the active time for measurements based on the CSIRS resource configuration for the unicast BWP and the UE may expect at least one of the CSIRS, the DMRS and the common RS (MBS RS) in the MBS BWP or the CFR, provided the MBS active time may be applicable for receiving a specific MBS by the UE in the MBS BWP or the CFR. In an embodiment, the CSI feedback may also be generated in the unicast BWP other than during the active time for measurements based on CSI-RS resource configuration for unicast BWP and the UE is required to perform a measurement of at least one of the CSIRS, the DMRS and the common RS (MBS RS) in the MBS BWP or the CFR, such that a MBS active time is applicable for receiving a specific MBS by the UE in the MBS BWP or CFR.

In another embodiment of the invention, if the UE is configured with the DRX and configured to monitor a DCI format e.g. DCI format 2_6, and DRX cycle in use is larger than 80 ms, the CSIRS resources may not be available at the time other than the active time and during a time duration indicated by the drx-onDurationTimer also outside the active time for measurements based on the CSIRS resource configuration for the unicast BWP. Otherwise when the unicast DRX cycle in use is equal or smaller than 80 ms, the UE may assume the CSIRS is available for measurements based on the CSIRS resource configuration for the unicast BWP. In both scenarios, the UE may expect at least one of the CSIRS, the DMRS and the common RS (MBS RS) in the MBS BWP or the CFR, such that the MBS active time may be applicable for receiving a specific MBS by the UE in the MBS BWP or the CFR.

In an alternative embodiment, when a MBS DRX cycle is equal or less than 80 ms, the UE may expect at least one of the CSIRS, the DMRS and the common RS (MBS RS) in the MBS BWP or the CFR during an inactive time of the MBS DRX cycle. when the MBS DRX cycle is larger than 80 ms, the UE may expect at least one of the CSIRS, the DMRS and the common RS (MBS RS) in MBS BWP or the CFR during the active time of the MBS DRX cycle.

Continuing with the above embodiment, the process may include transmitting (step 110) the measurement report associated with the MBS reception to the network. In an embodiment, the measurement report may be transmitted over an Uplink (UL) channel on one of the BWP and the CFR associated with the unicast.

In an embodiment, the measurement and evaluation, generating the measurement report and transmitting the measurement report on the BWP or the CFR associated with one of the unicast and the MBS is performed during one of an active time and a timer duration indicated by a DRX On-duration timer outside the active time based on the one or more reference signals, an active time associated with the unicast DRX timing based on the one or more reference signals, an active time associated with the MBS DRX timing based on the one or more reference signals, and a common time between an active time associated with the unicast DRX timing and an active time associated with the MBS DRX timing based on the one or more reference signals. In an embodiment, the UE may be configured to monitor a DCI format such as a DCI format 2_6. In an embodiment, the measurement and evaluation, generating the measurement report and transmitting the measurement report on the BWP or the CFR associated with one of the unicast and the MBS is performed MBS irrespective of the active time associated with the unicast DRX timing, the active time associated with the MBS DRX timing, the unicast DRX timing and the MBS DRX timing based on the one or more reference signals.

FIG. 2 illustrates an operational flow diagram 200 depicting a process for measuring the MBS, in accordance with an embodiment of the present subject matter. In an embodiment, the measuring the MBS is performed for generating a measurement report. In an embodiment, the measurement report may be a mobility measurement report. In an embodiment, the MBS may be measured for transmitting the measurement report to a network. In an embodiment, the transmission may be performed over an Uplink (UL) channel on the BWP or the CFR associated with a unicast such as Point To Point (PTP) mode.

Continuing with the above embodiment, the process may include performing by the UE one of step 202a, step 202b, step 202c, and step 202d. In an embodiment, at step 202a, the process may proceed towards reusing another measurement report associated with the unicast. In an embodiment, unicast measurements may be performed over a wideband signal such as a CSIRS over an active unicast BWP or specific sub-bands. Further, the unicast measurement may be reused for the MBS measurement (wide-band, sub-band(s), best sub-band(s) basis) for the MBS reception. In an embodiment, the UE may report the unicast measurement as the MBS measurement. In an alternative embodiment, a gNB may also interpret the MBS measurements from the unicast measurement received from the UE.

Furthermore, at step 202b, the process may include deriving the measurement report for the MBS from the other measurement report associated with the unicast. In an embodiment, deriving may be performed by altering one or more of a measured bandwidth, a BWP and a sub-band, measured quantities and measurement timings. In an embodiment, alteration may be performed in accordance with at least one of the MBS BWP or the CFR, the MBS received by the UE, the MBS allocations and the MBS DRX timings. In an embodiment, measurement results achieved with the altered settings or configurations may be used to report to the gNB for the MBS measurement.

Continuing with the above embodiment, at step 202c, the process may proceed towards utilizing a sub-set of the other measurement report availed for the unicast.

Subsequently, at step 202d, the process may include performing the measurement operation and generating the measurement report with at least one of the one or more configurations such as a measurement configuration and a reporting configuration and the one or more reference signals for the MBS. In an embodiment, generating the measurement report may be based on measuring one or more reference signals from the one or more configurations of the BWP or the CFR associated with one of the unicast and the MBS. In an embodiment, the MBS measurement feedback may be performed similarly with respect to a unicast measurement over one or more of a Physical Uplink Control Channel (PUCCH) channel and a Physical Uplink Shared Channel (PUSCH) channel using a MBS CSI MAC CE. In an embodiment, one or more of the PUCCH channel and the PUSCH and the MBS CSI MAC CE may be transmitted over a unicast uplink BWP in accordance with the unicast DRX timings or in accordance of MBS DRX timings or irrespective of either DRX timings or in an embodiment, with an active time as per both the DRX timings of unicast DRX and a MBS DRX scheduling.

In an embodiment, a dedicated RRC configuration for the UE may be configured to provide the MBS BWP or the CFR configuration parameters. One or more of a MBS-PTM-BWP and MBS-PTM-FreqResource may provide an overall allocation in a frequency domain for the MBS that the network may be utilizing for PTM services and the MBS BWP or the CFR may be associated with the unicast BWP or may be confined within the unicast BWP. Further, an actual allocation for the MBS received by the UE and addressed by one or more of the G-RNTI and a Cell-Radio Network Temporary Identifier (C-RNTI) over the MBS BWP or the CFR is provided by a dynamic indication in the FDRA (Frequency Domain Resource Allocation) field in the DCI (Downlink control Information) of the PDCCH channel. For a time domain allocation for the MBS, the UE may receive the same through the TDRA field carrying an index to TDRA configurations in a RRC message in DCI (Downlink control Information) of the PDCCH channel and may therefore be, dynamically signaled to the UE.

In another embodiment, the MBS operation may also utilize one or more of the uplink physical channel and the uplink BWP related to the DL unicast BWP associated with the MBS BWP or the CFR. In an embodiment, to that understanding, similar physical uplink channels such as the PUCCH or the PUSCH may be used to carry the uplink signaling information such as the measurement report, CSI feedback, HARQ feedback or the like pertaining to the MBS.

In an embodiment, where it is determined that one or more of the same unicast PUCCH and the PUSCH channel are used for the MBS measurement, CSI feedback, HARQ feedback and other uplink transmissions, the PUCCH format and configuration and PUSCH format and configuration may be different for the MBS or the unicast. In an alternative embodiment, the PUCCH format and configuration and PUSCH format and configuration may be partially or completely same for unicast and MBS.

In an embodiment, one or more of an explicitly uplink BWP and uplink physical channels may be specified and provided to the UE corresponding to the MBS BWP or the CFR. In an embodiment, it may be implied that the distinct physical uplink channels such as the PUCCH or the PUSCH may be used to carry the uplink signaling information such as the measurement report, the CSI feedback, and the HARQ feedback pertaining to MBS.

FIG. 3 illustrates an operational flow diagram 300 depicting a process for performing a CSI evaluation, in accordance with an embodiment of the present subject matter. In an embodiment, the CSI evaluation may be performed for generating a measurement report. In an embodiment, the measurement report may be a CSI feedback. In an embodiment, the CSI evaluation may be performed for transmitting the measurement report to a network. In an embodiment, the transmission may be performed over an Uplink (UL) channel on the BWP or the CFR associated with a unicast such as Point To Point (PTP) mode.

Continuing with the above embodiment, the process may include performing by the UE one of step 302a, step 302b, step 302c, and step 302d. In an embodiment, at step 302a, the process may proceed towards reusing another CSI evaluation associated with the unicast. In an embodiment, unicast measurements may be performed over a wideband signal such as a CSIRS over an active unicast BWP or specific sub-bands. Further, the unicast measurement may be reused for the CSI evaluation (wide-band, sub-band(s), best sub-band(s) basis) for the MBS reception. In an embodiment, the UE may report the unicast measurement as the CSI evaluation. In an alternative embodiment, a gNB may also interpret the CSI evaluation from the unicast measurement received from the UE.

Furthermore, at step 302b, the process may include deriving the CSI evaluation for the MBS from the other CSI feedback associated with the unicast. In an embodiment, deriving may be performed by altering one or more of a measured bandwidth, a BWP and a sub-band, measured quantities and measurement timings. In an embodiment, alteration may be performed in accordance with at least one of the MBS BWP or the CFR, the MBS received by the UE, the MBS allocations and the MBS DRX timings. In an embodiment, measurement results achieved with the altered settings or configurations may be used to report to the gNB for the CSI evaluation.

Continuing with the above embodiment, at step 302c, the process may proceed towards utilizing a sub-set of the other CSI evaluation availed for the unicast.

Subsequently, at step 302d, the process may include performing the CSI evaluation operation and generating the CSI feedback with at least one of the one or more configurations such as a measuring configuration and a reporting configuration and the one or more reference signals for the MBS. In an embodiment, performing the CSI evaluation operation may be based on measuring one or more reference signals from the one or more configurations of the BWP or the CFR associated with one of the unicast and the MBS. In an embodiment, the CSI evaluation may be performed similarly with respect to a unicast measurement over one or more of a PUCCH channel and a PUSCH channel using a MBS CSI MAC CE. In an embodiment, one or more of the PUCCH channel and the PUSCH and the MBS CSI MAC CE may be transmitted over a unicast uplink BWP in accordance with the unicast DRX timings or in accordance of MBS DRX timings or irrespective of either DRX timings or in an embodiment, with an active time as per both the DRX timings of unicast DRX and a MBS DRX scheduling.

FIG. 4 illustrates an operational flow diagram 400 depicting a process for receiving a message transmitted by a network for configuring a UE and performing measurement by the UE, in accordance with an embodiment of the present subject matter. In an embodiment, the message may be message may be one of a SIB message, a MCCH message and an RRC reconfiguration message. In an embodiment, the message may include at least one of one or more configurations, and one or more reference signals of one or more of a BWP and a CFR associated with one of a unicast and a MBS. In an embodiment, the one or more configurations may include a MBS measurement resource configuration, a MBS measurement reporting configuration, a MBS CSI resource configuration, and a MBS CSI feedback reporting configuration. Furthermore, the one or more reference signals may include at least one of a CSIRS, a DMRS, and a common MBS reference signal.

Continuing with the above embodiment, at step 402, the process may include detecting an expiry of a bwp-inactivitytimer associated with an active Down Link Bandwidth Part (DL BWP). In an embodiment, the UE may be receiving an MBS prior to the expiration.

In response to expiration of the bwp-inactivitytimer associated with the active DL BWP, at step 404, the process may include determining whether a default DL BWP associated with the MBS is configured or not. In an embodiment, the determination may be performed by the UE. Moving forward, the process may proceed towards step 406 in response to determining that the default DL BWP associated with the MBS is configured. Furthermore, the process may proceed towards step 408 in response to determining that the default DL BWP associated with the MBS is not configured.

Continuing with the above embodiment, the at step 406, the process may include switching from the DL BWP to another BWP indicated by the default DL BWP. In an embodiment, the switching may be performed by the UE. Furthermore, the process may proceed towards step 414. In an embodiment, the UE may be configured with the MBS and receive one or more reference signals and perform a measurement operation and report one of a CSI feedback and a measurement report.

Moving forward, at step 408, the process may include determining whether an initial DL BWP associated with the MBS is configured or not. In an embodiment, the determination may be performed by the UE. In an embodiment, where it is determined that the initial DL BWP associated with the MBS is configured, the process may proceed towards step 410. In an embodiment, where it is determined that the initial DL BWP associated with the MBS is not configured, the process may proceed towards step 412.

At step 410, the process may include switching from the DL BWP to another BWP indicated by the initial DL BWP. In an embodiment, the switching may be performed by the UE. Furthermore, the process may proceed towards step 414. In an embodiment, the UE may be configured with the MBS and receive one or more reference signals and perform a measurement operation and report one of a CSI feedback and a measurement report.

At step 412, the process may include continuing to receive the MBS on the DL BWP by avoiding the switching from the DL BWP to another BWP. Furthermore, the process may proceed towards step 414. In an embodiment, the UE may be not configured with the MBS and receive one or more reference signals and perform a measurement operation and report one of a CSI feedback and a measurement report.

At step 414, the process may include receiving the MBS on the DL BWP in the de-activated state. In an embodiment, receiving the MBS may be based on receiving the message at the UE.

Figure 5:
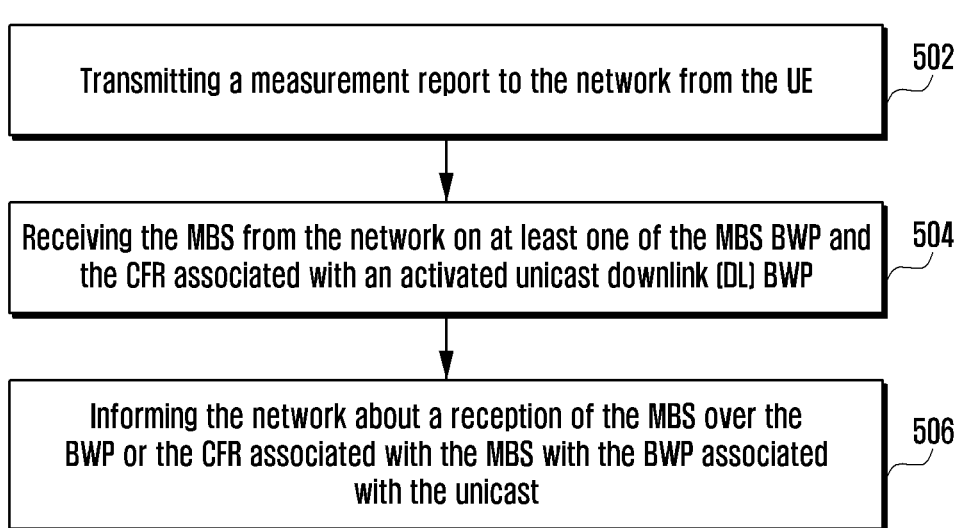
FIG. 5 illustrates an operational flow diagram depicting a process for measuring an MBS at a UE, in accordance with an embodiment of the present subject matter.

FIG. 5 illustrates an operational flow diagram depicting a process for measuring an MBS at a UE, in accordance with an embodiment of the present subject matter. In an embodiment, receiving the MBS at the UE may be based on configuring the UE by a network. In an embodiment, the UE may be configured based on at least one of one or more configurations, and one or more reference signals of one or more of a Bandwidth Part (BWP) or a Common Frequency Resource (CFR). In an embodiment, the one or more of the BWP or the CFR may be associated with one of a unicast and the MBS. In an embodiment, the message may be one of a System Information Block (SIB) message, a MBS Control Channel (MCCH) message and a Radio Resource Configuration (RRC) reconfiguration message.

Continuing with the above embodiment, the process may include transmitting (step 502) a measurement report to the network from the UE. In an embodiment, the measurement report may be at least one of a mobility measurement report and a CSI feedback. In an embodiment, the mobility measurement report may be based on measuring the MBS and the CSI feedback may be based on a CSI evaluation.

Moving forward, in response to transmitting the measurement report, the process may include receiving (step 504) the MBS from the network on at least one of the MBS BWP and the CFR associated with an activated unicast downlink (DL) BWP.

Continuing with the above embodiment, the process may proceed towards informing (step 506) the network about a reception of the MBS over the BWP or the CFR associated with the MBS with the BWP associated with the unicast. Further, the informing may be based on an embodiment where it is determined that the network may not configure the active DL BWP for a serving cell as dormant or make the same, deactivated. Furthermore, the network may continue transmitting one or more of a common MBS RS and a DMRS/TRS/CSIRS pertaining to the MBS BWP or CFR over associated activated BWP such as a MBS BWP or the CFR.

In an embodiment, if a BWP is activated and the active DL BWP for a serving cell may be a dormant BWP and the UE is not receiving the MBS the MBS BWP or the CFR associated with the DL BWP, the UE may be configured to stop a bwp-Inactivity Timer of the Serving cell, if the bwp-InactivityTimer is running. Furthermore, the UE may be configured to not monitor the PDCCH on the BWP, and the PDCCH for the BWP. Furthermore, the UE may be configured to not receive a DL-SCH on the BWP. In an embodiment, the UE may be configured to not report the CSI feedback on the BWP, report a CSI except aperiodic CSI for the BWP, and not transmit a SRS on the BWP, a UL-Shared Channel (CH) on the BWP. Furthermore, the UE may be configured to not transmit on a RACH on the BWP. In an embodiment, the UE may be configured to not transmit a PUCCH on the BWP.

In an embodiment, the UE may further be configured to clear any configured downlink assignment and any configured uplink grant Type 2 associated with a SCell respectively, suspend any configured uplink grant Type 1 associated with the SCell. In an embodiment, the UE may be configured to perform a beam failure detection and a beam failure recovery for the SCell if beam failure is detected in an embodiment where the UE is configured.

In an embodiment, where it is determined that a state of the unicast DL BWP is changed from an active state to one of a deactivated state and a dormant state, the process may include monitoring one of a Physical Downlink Control Channel (PDCCH) for at least one of a Group-Radio Network Temporary Identifier (G-RNTI) and a Cell-Radio Network Temporary Identifier (C-RNTI) for the MBS by the UE as the UE may not consider the DL BWP as deactivated or dormant for reception of the MBS. Furthermore, the process may include performing the measurement operation for one of the mobility measurement and the CSI evaluation for the one or more reference signals. To that understanding, the process may include generating one of the mobility measurement report and the CSI feedback for the one or more reference signals. In an embodiment, the state may be changed due to an inactivity such as no traffic for a stipulated amount of time or a network decision to change the active BWP.

In an embodiment, if a BWP is activated and the active DL BWP for a serving cell may be a dormant BWP and the UE is receiving the MBS the MBS BWP or CFR associated with the DL BWP, the UE may be configured to continue a bwp-InactivityTimer and/or MBSbwp-InactivityTimer, monitor the PDCCH on the BWP, monitor the PDCCH for the BWP for MBS allocations, receive a DL-Shared Channel (DL-SCH) on the BWP for a MBS control or traffic data. In an embodiment, the UE may further be configured to continue reporting the CSI feedback on the BWP, reporting the CSI feedback, transmitting a SRS on the BWP, transmitting on an UL-SCH on the BWP, transmitting on a RACH on the BWP for one of a MBS signaling and, a feedback. In an embodiment, the UE may further be configured to transmit the PUCCH on the BWP for the MBS signaling and, the feedback, clear any configured downlink assignment and any configured uplink grant Type 2 associated with a SCell respectively, suspend any configured uplink grant Type 1 associated with the SCell. In an embodiment, the UE may be configured to perform a beam failure detection and a beam failure recovery for the SCell if beam failure is detected in an embodiment where the UE is configured.

In an embodiment, if the BWP is de-activated or switched and the UE is not receiving the MBS over the MBS BWP or the CFR associated with the DL BWP, the UE may be configured to not transmit on a UL-SCH on the BWP, transmit on the RACH on the BWP, transmit the PUCCH on the BWP. Further, the UE may not be configured to monitor the PDCCH on the BWP, report the CSI feedback for the BWP, transmit a SRS on the BWP, receive the DL-SCH on the BWP. In an embodiment, the UE may further be configured to clear any configured downlink assignment and any configured uplink grant Type 2 associated with a SCell respectively, suspend any configured uplink grant Type 1 associated with the SCell. In an embodiment, the UE may be configured to perform a beam failure detection and a beam failure recovery for the SCell if beam failure is detected in an embodiment where the UE is configured.

Figure 6:
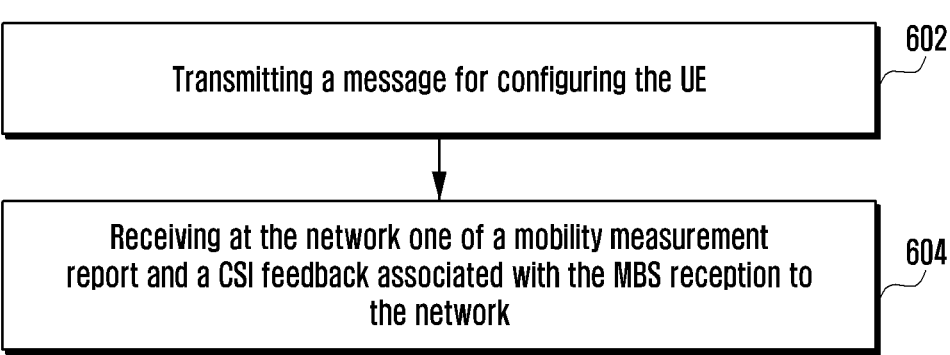
FIG. 6 illustrates a schematic flow diagram depicting a process for transmitting MBS measurement configuration and receiving a measurement report in 5G by a network, in accordance with an embodiment of the present subject matter.

FIG. 6 illustrates a schematic flow diagram 600 depicting a process for transmitting MBS measurement configuration and receiving a measurement report in 5G by a network, in accordance with an embodiment of the present subject matter. In an embodiment, the MBS may be transmitted to a UE communicating with the network.

Continuing with the above embodiment, the process may include transmitting (step 602) a message for configuring the UE. In an embodiment, the message may include at least one of one or more configurations, and one or more reference signals of one or more of a BWP or a CFR associated with one of a unicast and the MBS. In an embodiment, the message may be one of a SIB message, a MCCH message and an RRC reconfiguration message. Further, the one or more configurations includes a MBS measurement resource configuration, a MBS measurement reporting configuration, a MBS CSI resource configuration, and a MBS CSI feedback reporting configuration. Further, the one or more reference signals includes at least one of a CSIRS, a DMRS, and a common MBS reference signal.

Continuing with the above embodiment, the process may include receiving (step 604) at the network at least one of a mobility measurement report and a CSI feedback associated with the MBS reception to the network. In an embodiment, the mobility measurement report may be based on a mobility measurement and the CSI feedback may be based on a CSI evaluation. In an embodiment, the measurement report may be received over an Uplink (UL) channel on the BWP associated with the unicast transmitted by the UE. In an embodiment, the process may include determining by the UE a timing associated with transmitting the measurement report based on one or more of a unicast Discontinuous Reception (DRX) timing, a MBS DRX timing, a common time between the unicast DRX timing and the MBS DRX timing.

Figure 7:
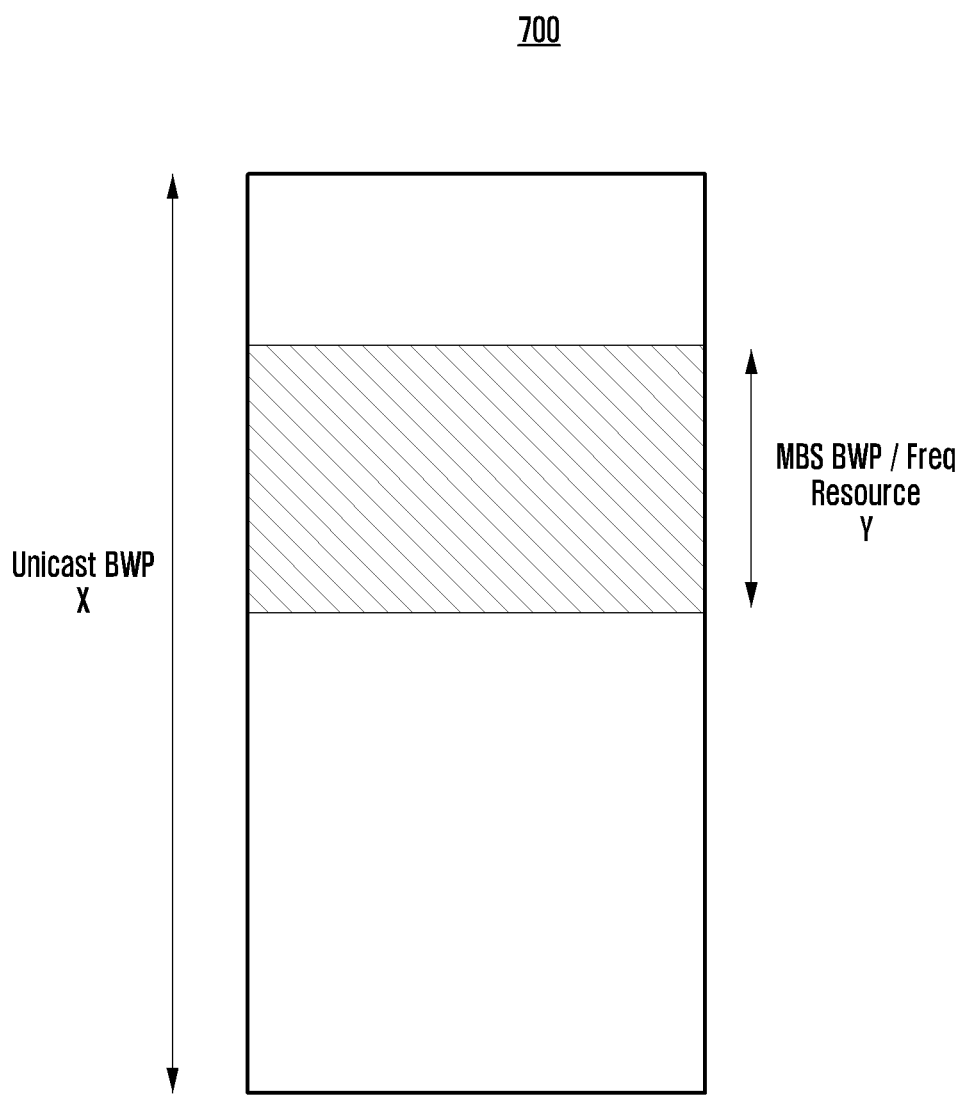
FIG. 7 illustrates a diagram depicting an MBS BWP or frequency resource 'Y' confined within the unicast BWP 'X' such that X>Y in accordance with an embodiment of the present subject matter.

FIG. 7 illustrates a diagram 700 depicting an MBS BWP or frequency resource 'Y' confined within the unicast BWP 'X' such that X>Y in accordance with an embodiment of the present subject matter. In the present embodiment, performing BWP switching across unicast and MBS may not be required and thereby, no switching delay. An UE may receive the unicast and MBS together. MBS BWP or frequency resource is statically or dynamically allocated.

Figure 8:
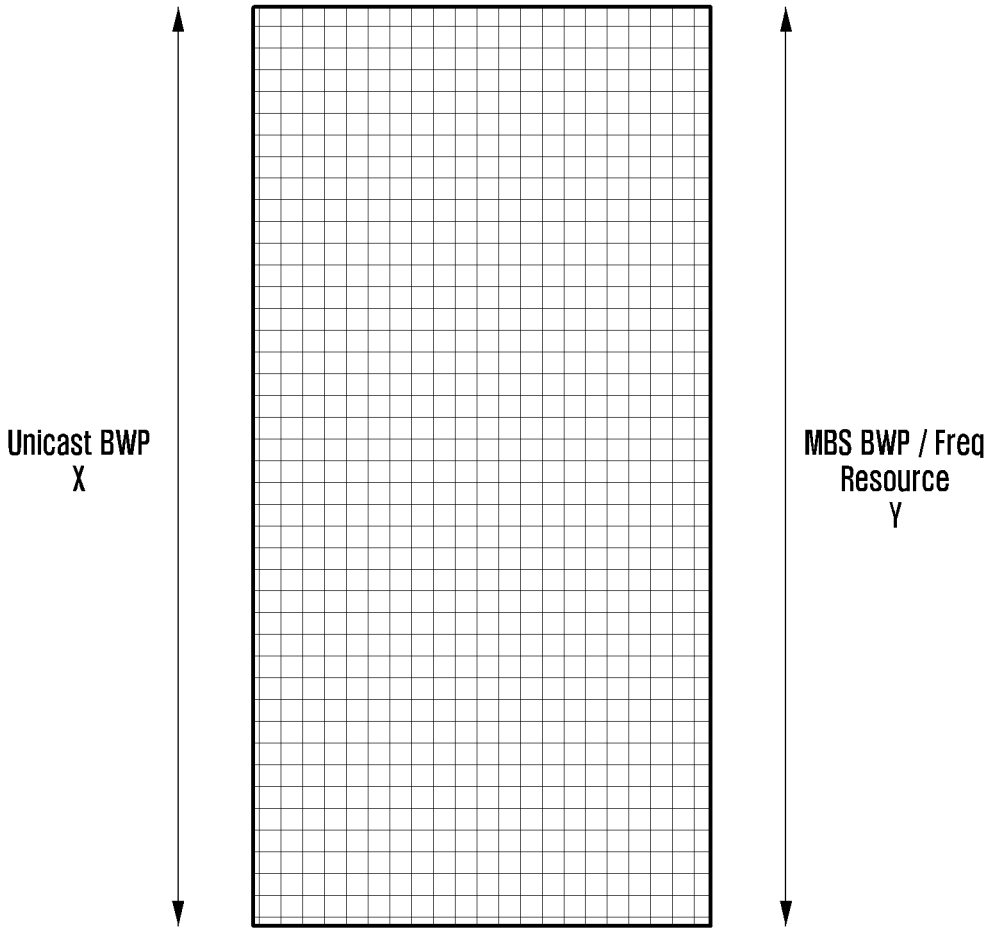
FIG. 8 illustrates a diagram depicting an MBS BWP or frequency resource 'Y' is confined within the unicast BWP 'X' such that X=Y, in accordance with an embodiment of the present subject matter.

FIG. 8 illustrates a diagram 800 depicting an MBS BWP or frequency resource 'Y' is confined within the unicast BWP 'X' such that X=Y, in accordance with an embodiment of the present subject matter. In the present embodiment, performing BWP switching across unicast and MBS may not be required and thereby, no switching delay. An UE may receive the unicast and MBS together.

Figure 9:
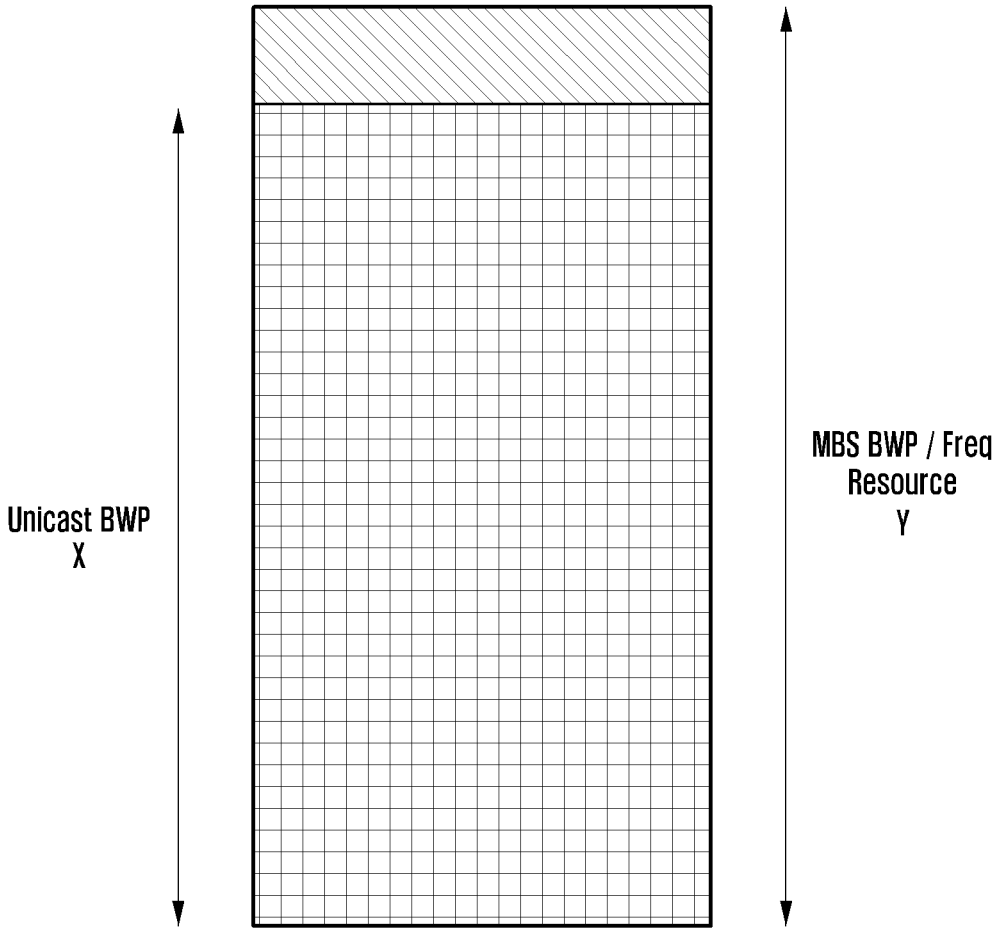
FIG. 9 illustrates a diagram depicting an MBS BWP or frequency resource 'Y' extending beyond the unicast BWP 'X' such that X<Y, in accordance with an embodiment of the present subject matter.

FIG. 9 illustrates a diagram 900 depicting an MBS BWP or frequency resource 'Y' extending beyond the unicast BWP 'X' such that X<Y, in accordance with an embodiment of the present subject matter. An UE may receive the unicast and MBS together provided UE dynamically switches between MBS BWP or frequency resource and unicast BWP or utilize two different reception paths or utilize carrier aggregation.

Figure 10:
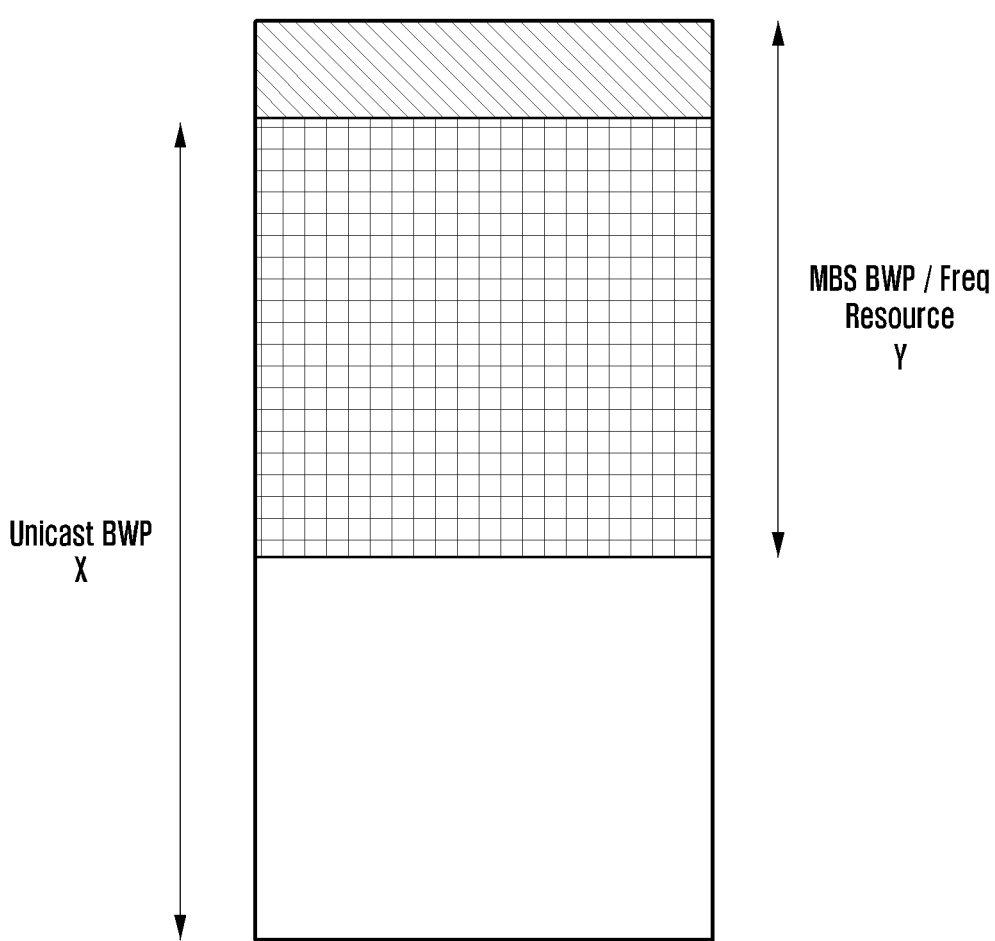
FIG. 10 illustrates a diagram depicting an MBS BWP or frequency resource 'Y' is not completely confined within the unicast BWP 'X', in accordance with an embodiment of the present subject matter.

FIG. 10 illustrates a diagram 1000 depicting an MBS BWP or frequency resource 'Y' is not completely confined within the unicast BWP 'X', in accordance with an embodiment of the present subject matter. There is a start offset for MBS BWP or frequency resource with respect to unicast BWP. Still, cases X>Y, X=Y and X<Y may be possible. An UE may receive the unicast and MBS together provided UE dynamically switches between MBS BWP or frequency resource and unicast BWP or utilize two different reception paths or utilize carrier aggregation.

Figure 11:
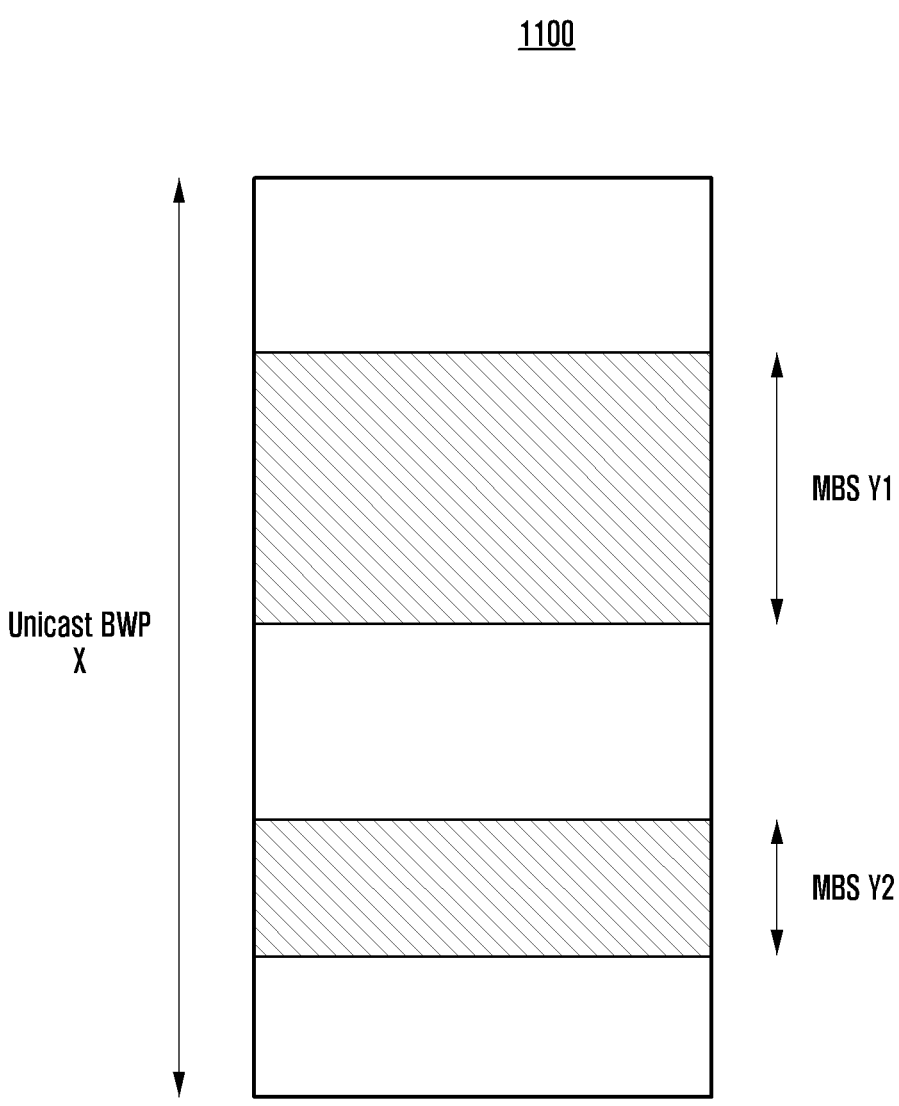
FIG. 11 illustrates a diagram depicting an MBS BWP(s) or frequency resources 'Y1', 'Y2', . . . , 'Yn' confined within the unicast BWP 'X' such that X>Y1, X>Y2, . . . , X>Yn, in accordance with an embodiment of the present subject matter.

FIG. 11 illustrates a diagram 1100 depicting an MBS BWP(s) or frequency resources 'Y1', 'Y2', . . . , 'Yn' confined within the unicast BWP 'X' such that X>Y1, X>Y2, . . . , X>Yn, in accordance with an embodiment of the present subject matter. In this configuration, there is no need to do BWP switching across unicast and MBS and thereby, no switching delay. An UE may receive the unicast and MBS together. MBS BWP or frequency resource Y1, Y2, . . . , Yn are statically or dynamically allocated.

Figure 12:
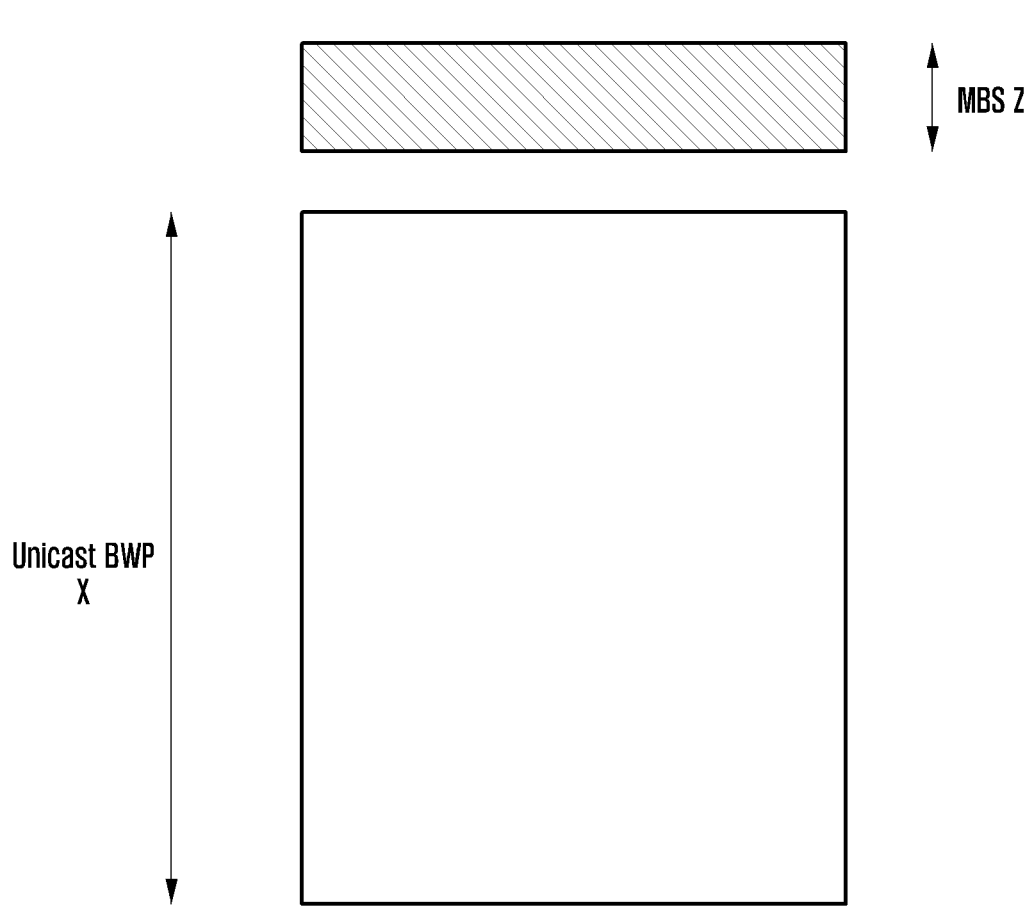
FIG. 12 illustrates a diagram depicting an MBS BWP or frequency resource 'Z' is completely different from Unicast BWP X, in accordance with an embodiment of the present subject matter.

FIG. 12 illustrates a diagram 1200 depicting an MBS BWP or frequency resource 'Z' is completely different from Unicast BWP X, in accordance with an embodiment of the present subject matter. Therefore, there is BWP switching involved. An UE may receive the unicast and MBS together provided UE dynamically switches between MBS BWP or frequency resource and unicast BWP or utilize two different reception paths or utilize carrier aggregation.

Further, a static MBS configuration in FIG. 7, FIG. 9, and FIG. 11 with in BWP may restrict flexibility scheduling of MBS and Unicast resources, therefore, gNB should provision dynamic/semi-static MBS frequency allocation within BWP. Dynamic or semi static "sub BWP (MBS)" could be configured by RRC signaling and MAC-CE or PDCCH indication could be used to activate or deactivate a configuration.

Furthermore, a dynamic or semi static configuration with change in "sub BWP" within the BWP may also add flexibility in managing resources as per channel condition and geographical area to minimize interference in MBS resources. Also, the MBS broadcast services and/or low QoS multicast services are provided over initial BWP (including allocation for MBS BWP or frequency resources and/or initial BWP is extended to support MBS BWP or frequency resource and/or part of Initial BWP) and/or dedicated active BWP(s) of the UE(s). These MBS are receivable by Idle and/or Inactive and/or Connected mode UEs.

Figure 13:
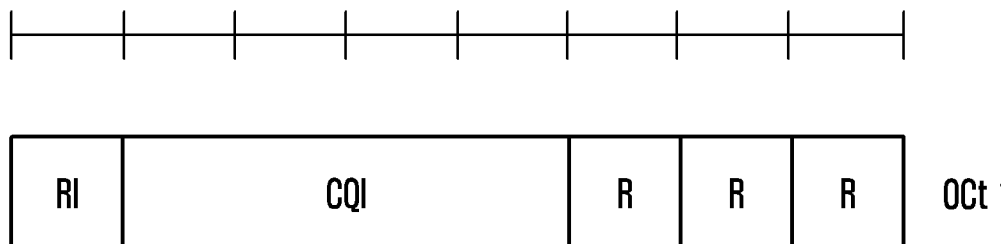
FIG. 13 illustrates a diagram depicting a MBS CSI reporting MAC CE, in accordance with an embodiment of the present subject matter.

FIG. 13 illustrates a diagram 1300 depicting a MBS CSI reporting MAC CE, in accordance with an embodiment of the present subject matter. The MBS CSI Reporting MAC CE is identified by a MAC sub-header with a specified Logical Channel Identity (LCID). The LCID may be mapped to the MBS (e.g. G-RNTI or MBS LCID) that UE is receiving or configured with. UE may sent multiple MBS CSI Medium Access Control (MAC) Control Element (CE) in case it receives it multiple MBS or MBS pertain to multiple MBS BWP or frequency resources. MBS CSI MAC CE may include values for rank indicator, pre-coding matrix indicator, channel quality indicator or the like.

Referring to FIG. 13 various parameter as indicated in FIG. 13 is explained as follows:

a. Rank Indicator (RI): The RI field may indicate the derived value of the rank indicator for the MBS CSI reporting.

b. Channel quality Indicator (CQI): The CQI field may indicate the derived value of the channel quality indicator for the MBS CSI reporting.

c. R: Reserved bit, set to 0.

In one embodiment of the present subject matter, the UE may be configured to utilize one or more of one or more reference signals such as a common MBS RS, a CSIRS, a DMRS reference signal for a MBS measurement, demodulation, beam management, link adaptation and tracking purposes. In an embodiment, the present subject matter provides a usage of a common scrambling/descrambling identity for one or more reference signals. The common scrambling identity may be either configured in a dedicated/broadcasted configuration or a pre-specified and therefore, may be available to the UE receiving the MBS in a PTM mode. Furthermore, similarly, for an idle/inactive mode, the UE along with a connected mode UE receiving the broadcast or low QoS multicast MBS may also utilize the common scrambling/descrambling identity for the one or more reference signals used over an initial BWP or the MBS BWP or a dedicated BWP. In an embodiment, the scrambling identity or a root sequence or seed associated with the scrambling identity used to scramble or descramble may be is provided to the UE in a broadcast signaling such that an idle/inactive along with the connected mode UE receiving one or more of a broadcast and a low QoS multicast MBS may receive a similar identity. In an embodiment, the scrambling/descrambling identity may be common or separate for the physical channels PDCCH(s) or the PDSCH(s) and accordingly, be a common identify or G-RNTI/C-RNTI based specific scrambling/descrambling identity may be utilized. In an alternative embodiment, it may be derived or based on some formulation or function of the G-RNTI or Temporary Mobile Group Identifier (TMGI) or C-RNTI used for the specific MBS or specific PDCCH(s) or specific PDSCH(s).

In an embodiment, a Dynamic Spectrum Sharing (DSS) may allow sharing a spectrum dynamically between Long Term Evolution (LTE) and 5G networks for an operator. In an embodiment, the LTE may also include, in time domain, possible Multimedia Broadcast multicast service Single Frequency Network (MBSFN) subframes used for an evolved Multimedia Broadcast and Multicast Services (eMBMS) reception purpose. In an embodiment, the present subject matter proposes a DSS scenario to be extended to a scenario where NR network may also utilize the shared spectrum for an NR MBS operation purpose, in a frequency domain, along with a NR unicast. Furthermore, effectively, an LTE system may include a LTE Cell Specific Reference Signal (CRS) and an MRS (MBMS reference signal). Furthermore, a NR system may include a DMRS, a CSIRS, a SSB, a PTRS, a TRS for the unicast along with one or more of a common MBS RS, the DMRS/CSIRS used for the MBS purpose. In an embodiment, the MBS BWP or the CFR associated or confined within unicast BWP may not be considered for a DSS based time and/or frequency resources based dynamic sharing between the LTE and the NR. I In an embodiment, the MBS BWP or the CFR associated or confined within unicast BWP may be considered for the DSS based time and/or frequency resources based dynamic sharing between the LTE and the NR. To that understanding, it may be implied that an NR MBS allocation in time and frequency resource may be partially or completely affected or may not be provided when there is sharing of time or frequency resources with the LTE or the LTE eMBMS. Accordingly, measurements and reporting and/or CSI feedback resources over the MBS BWP or frequency resource may also be affected/changed/not operated.

Figure 14:
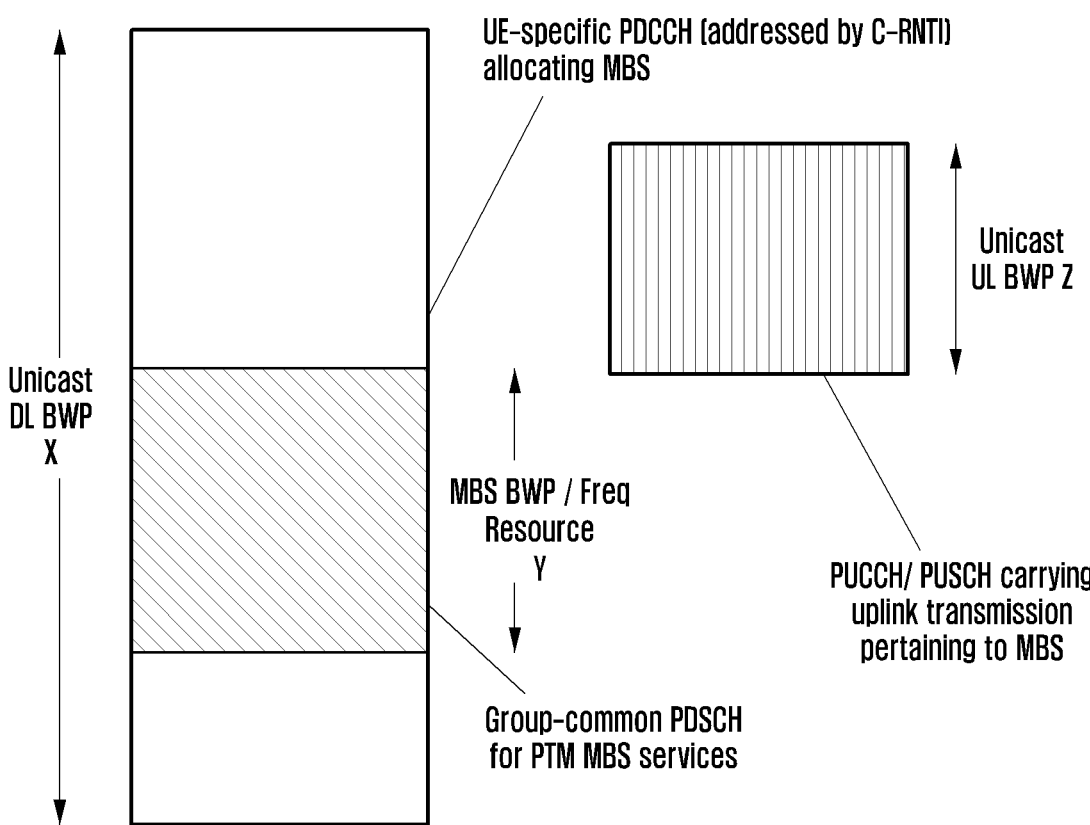
FIG. 14 illustrates a diagram depicting a method for BWP/common frequency resource allocation and feedback transmission of unicast channels and MBS channels, in accordance with an embodiment of the present subject matter.

FIG. 14 illustrates a diagram 1400 depicting a method for a BWP allocation or a common frequency resource allocation and feedback transmission of unicast channels and MBS channels, in accordance with an embodiment of the present subject matter. In an embodiment, the method further depicts measurement, measurement report, feedback and HARQ feedback timings. MBS in PTM mode are targeted for a group of UEs and alike to LTE SC-PTM, should have service specific DRX scheduling. In an embodiment, one difference from SC-PTM is the reliability support for NR MBS (e.g. support of HARQ, CSI feedback etc.). There is certain issue for PTM as well as split MBS bearer (PTM+ PTP) when uplink signaling/RLC status/HARQ feedback/ CSI feedback etc. need to be transmitted as these would be mapped to uplink channels and will override UE specific C-DRX. This affects the legacy procedure as downlink allocations, CSIRS measurements and CSI feedback/HARQ feedback are not performed in inactive time of C-DRX. FIG. 8 depicts the generic structure for these unicast and MBS channels and their BWP mapping and shows the allocation and feedback transmission. When these MBS, which require uplink transmission, are scheduled over group-common PDSCH but addressed through UE specific C-RNTI on UE specific PDCCH, there is alignment possible between C-DRX and MBS DRX scheduling. When there is no uplink transmission needed, pertinent MBS can be scheduled through group-common PDCCH with G-RNTI in accordance with MBS DRX scheduling.

In one embodiment, MBS requiring an uplink transmission are scheduled over group-common PDSCH but addressed through UE specific C-RNTI on UE specific PDCCH in order to have alignment between C-DRX and MBS DRX scheduling.

In another embodiment of the invention, uplink transmission for the MBS that includes at least one of CSI feedback, MBS MAC CSI CE, HARQ feedback, measurement report, UE assistance information, RLC status report, PDCP status report is carried out over the unicast uplink channel like PUCCH or PUSCH in accordance with the unicast DRX timings (i.e. active time of unicast DRX) and/or in accordance of MBS DRX timings (This also includes the case when either unicast active or inactive time of DRX is there) and/or irrespective of either unicast DRX timings or MBS DRX scheduling and/or when there is active time as per both the DRX timings of unicast DRX and MBS DRX scheduling.

Further, network may also provide at least one of the measurement resources, tracking resources, reference signals, uplink grants, scheduling request resource, RACH resources, CSI reporting configurations, HARQ retransmission etc. and associated operations and procedures are executed in accordance with the above description for the DRX and scheduling timings.

In one embodiment a WUS may indicate about the presence or absence of allocation of MBS that are scheduled over group-common PDSCH but addressed through UE specific C-RNTI on UE specific PDCCH.

In another embodiment of the invention, WUS indicates about the presence or absence of allocation of at least one of a MBS allocation that are scheduled over group-common PDSCH but addressed through UE specific C-RNTI on UE specific PDCCH, MBS allocation that are scheduled over group-common PDSCH and addressed through G-RNTI on group common PDCCH, MBS allocation that are scheduled over UE specific PDSCH and addressed through UE specific C-RNTI on UE specific PDCCH, and unicast allocations that are scheduled over UE specific PDSCH and addressed through UE specific C-RNTI on UE specific PDCCH. MBS allocations can be over MBS BWP or frequency resource or unicast BWP. Whereas unicast service allocation can be over unicast BWP.

Figure 15:
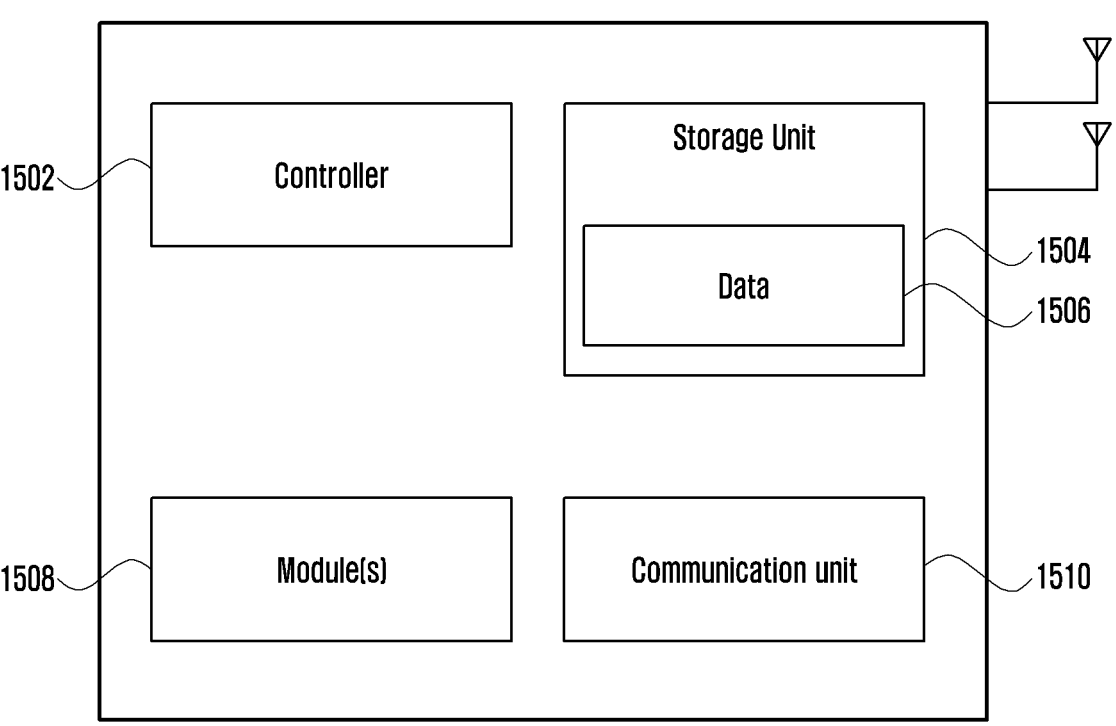
FIG. 15 is a diagram illustrating the configuration of a terminal (UE) in a wireless communication system according to an embodiment of the present subject matter.

FIG. 15 is a diagram illustrating the configuration of a terminal 1500 in a wireless communication system according to an embodiment of the present subject matter. Hereinafter, it is understood that terms including "unit" or "er" at the end may refer to the unit for processing at least one function or operation and may be implemented in hardware, software, or a combination of hardware and software.

Referring to FIG. 15, the terminal 1500 may include a controller 1502 (e.g., at least one processor), a storage unit 1504 (e.g., storage), data 1506 and, module(s) 1508, and a communication unit 1510 (e.g., communicator or communication interface or a transceiver or a transmitter, or a receiver). By way of example, the terminal 1500 may be a User Equipment, such as a cellular phone or other device that communicates over a plurality of cellular networks (such as a 4G, a 5G or pre-5G network or any future wireless communication network). In an embodiment, the controller 1502, the storage unit 1504, the data 1506, and the module(s) 1508, and the communication unit 1510 may be communicably coupled with one another.

As would be appreciated, the terminal 1500, may be understood as one or more of a hardware, a software, a logic-based program, a configurable hardware, and the like. In an example, the controller 1502 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/ or any devices that manipulate signals based on operational instructions. Among other capabilities, the controller 1502 may be configured to fetch and/or execute computer-readable instructions and/or data 1506 stored in the storage unit 1504.

In an example, the storage unit 1504 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The storage unit 1504 may store data, such as a basic program, an application program, configuration information, and the like for operating the terminal 1500. The storage unit 1504 may be configured as a volatile memory, a non-volatile memory, or a combination of a volatile memory and a non-volatile memory. The storage unit 1504 may include the data 1506. In addition, the storage unit 1504 may provide data stored therein in response to a request from the controller 1502.

The data 1506 serves, amongst other things, as a repository for storing data processed, received, and generated by one or more of, the controller 1502, the storage unit 1504, the module(s) 1508, and the communication unit 1510.

The module(s) 1508, amongst other things, may include routines, programs, objects, components, data structures, etc., which perform particular tasks or implement data types. The module(s) 1508 may also be implemented as, signal processor(s), state machine(s), logic circuitries, and/or any other device or component that manipulate signals based on operational instructions.

Further, the module(s) 1508 may be implemented in hardware, instructions executed by at least one processing unit, for e.g., controller 1502, or by a combination thereof. The processing unit may be a general-purpose processor which executes instructions to cause the general-purpose processor to perform operations or, the processing unit may be dedicated to performing the required functions. In another aspect of the present disclosure, the module(s) 708 may be machine-readable instructions (software) which, when executed by a processor/processing unit, may perform any of the described functionalities.

In some example embodiments, the module(s) 1508 may be machine-readable instructions (software) which, when executed by a processor/processing unit, perform any of the described functionalities.

The controller 1502 may control overall operations of the terminal 1500. For example, the controller 1502 may transmit and receive a signal via the communication unit 1510. Further, the controller 1502 records data in the storage unit 1504 and reads the recorded data. The controller 1502 may perform the functions of a protocol stack required by a particular communication standard. To this end, the controller 1502 may include at least one processor or microprocessor or may be a part of the processor. Also, a part of the communication unit 1510 and the controller 1502 may be referred to as a communication processor (CP).

Referring to FIG. 1, the communication unit 1510 may be configured to receive a message from a network for configuring the UE comprising at least one of one or more configurations, and one or more reference signals of one or more of a Bandwidth Part (BWP) or a Common Frequency Resource (CFR) associated with one of a unicast and the MBS.

Further, the controller 1502 may be configured to perform a measurement operation for the MBS reception for the one or more configurations based on the one or more reference signals associated with one or more of the unicast and the MBS. Further, the controller 1502 may be configured to generate a measurement report associated with the MBS reception based on a measurement of the MBS.

Continuing with the above embodiment, the controller 1502 may be configured to determine a timing associated with transmitting the measurement report based on one or more of a unicast Discontinuous Reception (DRX) timing, a MBS DRX timing, a common time between the unicast DRX timing and the MBS DRX timing and a time irrespective of the unicast DRX timing and the MBS DRX timing. In an embodiment, the communication unit 1510 may be configured to transmit the measurement report associated with the MBS reception to the network over an Uplink (UL) channel on the BWP or the CFR associated with the unicast.

Referring to FIG. 2, the controller 1502 may be configured to perform one of reusing another measurement report associated with the unicast, deriving the measurement report for the MBS from the other measurement report associated with the unicast by altering one or more of a measured bandwidth, a BWP and a sub-band, measured quantities and measurement timings in accordance with at least one of the MBS BWP or the CFR, the MBS service received by the UE, the MBS allocations and the MBS DRX timings, and utilizing a sub-set of the other measurement report availed for the unicast, and performing the measurement operation and generating the measurement report with at least one of the one or more configurations and the one or more reference signals for the MBS. In an embodiment, generating the measurement report may be based on measuring one or more reference signals from the one or more configurations of the BWP or the CFR associated with one of the unicast and the MBS.

Referring to FIG. 3, the controller 1502 may be configured to perform the CSI evaluation by performing one of reusing another CSI evaluation associated with the unicast, deriving the CSI evaluation for the MBS from the other CSI feedback associated with the unicast by altering one or more of a measured bandwidth, a BWP and a sub-band, measured quantities and measurement timings in accordance with at least one of the MBS BWP and the CFR, the MBS service received by the UE, the MBS allocations and the MBS DRX timings, utilizing a sub-set of the other CSI evaluation availed from the unicast, performing the CSI evaluation operation and generating the CSI feedback with one or more of the one or more configurations and the one or more reference signals for the MBS. Further, performing the CSI evaluation operation may be based on measuring one or more reference signals from the one or more configurations of the BWP or the CFR associated with one of the unicast and the MBS.

Referring to FIG. 4, the controller 1502 may be configured to detect an expiry of a bwp-inactivitytimer associated with an active DL BWP. Furthermore, the controller 1502 may be configured to include determining whether a default DL BWP associated with the MBS is configured or not in response to expiration of the bwp-inactivitytimer associated with the active DL BWP. In an embodiment, where it is determined that the MBS is configured, the controller 502 may be configured to switch from the DL BWP to another BWP indicated by the default DL BWP. In an embodiment, where it is determined that the MBS is not configured, the controller 1502 may be configured to determine whether an initial DL BWP associated with the MBS is configured or not. In response to determining that the initial DL BWP associated with the MBS is configured, the controller 1502 may be configured to switch from the DL BWP to another BWP indicated by the initial DL BWP. In an embodiment, where it is determined that the initial DL BWP associated with the MBS is not configured, the controller 1502 may be configured to continuing to receive the MBS on the DL BWP by avoiding the switching from the DL BWP to another BWP indicated by the initial DL BWP. Furthermore, the controller 1502 may be configured to receive the MBS on the DL BWP in the deactivated state. In an embodiment, receiving the MBS may be based on receiving the message at the UE.

Referring to FIG. 5, the communication unit 1510 may be configured to transmit a measurement report to the network from the UE. In an embodiment, the measurement report may be at least one of a mobility measurement report and a CSI feedback. Furthermore, the communication unit 1510 may be configured to receive the MBS from the network on at least one of the MBS BWP and the CFR associated with an activated unicast downlink (DL) BWP.

Continuing with the above embodiment, the controller 1502 may be configured to inform the network about a reception of the MBS over the BWP or the CFR associated with the MBS with the BWP associated with the unicast. Further, the controller 1502 may be configured to monitor one of a PDCCH for at least one of a G-RNTI and a C-RNTI for the MBS as the UE may not consider the DL BWP as dormant for reception of the MBS. Furthermore, the controller 1502 may be configured to perform the measurement operation for one of the mobility measurement and the CSI evaluation for the one or more reference signals.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method performed by a terminal in a wireless communication system, the method comprising:

receiving, from a base station, a message comprising configuration information on multicast and broadcast service (MBS) and configuration information on at least one reference signal associated with the MBS;

performing a measurement on the at least one reference signal associated with the MBS based on the configuration information on the at least one reference signal associated with the MBS; and transmitting, to the base station, a measurement report associated with the MBS comprising a measurement result of the at least one reference signal associated with the MBS, wherein a timing associated with transmitting the measurement report is determined based on a discontinuous reception (DRX) on duration time of a unicast and a DRX timing of the MBS.

2. The method of claim 1, wherein the message comprises a radio resource control (RRC) reconfiguration message, and wherein the at least one reference signal comprises at least one of a channel state information reference signal (CSI-RS) or a demodulation reference signal (DMRS).

3. The method of claim 1, wherein at least one reference signal associated with a unicast is further measured, and wherein the measurement report associated with the MBS further comprises a measurement result of the at least one reference signal associated with the unicast.

4. The method of claim 1, further comprising:

receiving, from the base station, a data associated with the MBS in a downlink bandwidth part (DL BWP);

in case that a timer associated with the downlink bandwidth part expires, determining that a default DL BWP associated with the MBS is configured, and switching from the DL BWP to the default DL BWP; and in case that the default DL BWP associated with the MBS is not configured, determining an initial DL BWP associated with the MBS, and switching from the DL BWP to the initial DL BWP.

5. A method performed by a base station in a wireless communication system, the method comprising:

transmitting, to a terminal, a message comprising configuration information on multicast and broadcast service (MBS) and configuration information on at least one reference signal associated with the MBS; and receiving, from the terminal, a measurement report associated with the MBS comprising a measurement result of the at least one reference signal associated with the MBS based on the configuration information on the at least one reference signal associated with the MBS, wherein a timing associated with transmitting the measurement report is determined based on a discontinuous reception (DRX) on duration time of a unicast and a DRX timing of the MBS.

6. The method of claim 5, wherein the message comprises a radio resource control (RRC) reconfiguration message, and wherein the at least one reference signal comprises at least one of a channel state information reference signal (CSI-RS) or a demodulation reference signal (DMRS).

7. The method of claim 5, wherein the measurement report associated with the MBS further comprises a measurement result of at least one reference signal associated with a unicast.

8. The method of claim 5, further comprising:

transmitting, to the terminal, a data associated with the MBS in a downlink bandwidth part (DL BWP), wherein in case that a timer associated with the downlink bandwidth part expires and a default DL BWP associated with the MBS is configured, the DL BWP is switched to the default DL BWP, and wherein in case that the timer associated with the downlink bandwidth part expires and the default DL BWP associated with the MBS is not configured, the DL BWP is switched to an initial DL BWP.

9. A terminal in a wireless communication system, the terminal comprising:

a communication unit; and a controller coupled with the communication unit and configured to:

receive, from a base station, a message comprising configuration information on multicast and broadcast service (MBS) and configuration information on at least one reference signal associated with the MBS, perform a measurement on the at least one reference signal associated with the MBS based on the configuration information on the at least one reference signal associated with the MBS, and transmit, to the base station, a measurement report associated with the MBS comprising a measurement result of the at least one reference signal associated with the MBS, wherein a timing associated with transmitting the measurement report is determined based on a discontinuous reception (DRX) on duration time of a unicast and a DRX timing of the MBS.

10. The terminal of claim 9, wherein the message comprises a radio resource control (RRC) reconfiguration message, and wherein the at least one reference signal comprises at least one of a channel state information reference signal (CSI-RS) or a demodulation reference signal (DMRS).

11. The terminal of claim 9, wherein at least one reference signal associated with a unicast is further measured, and wherein the measurement report associated with the MBS further comprises a measurement result of the at least one reference signal associated with the unicast.

12. The terminal of claim 9, the controller is further configured to:

receive, from the base station, a data associated with the MBS in a downlink bandwidth part (DL BWP), in case that a timer associated with the downlink bandwidth part expires, determine that a default DL BWP associated with the MBS is configured, and switch from the DL BWP to the default DL BWP, and in case that the default DL BWP associated with the MBS is not configured, determine an initial DL BWP associated with the MBS, and switch from the DL BWP to the initial DL BWP.

13. A base station in a wireless communication system, the base station comprising:

a communication unit; and a controller coupled with the communication unit and configured to:

transmit, to a terminal, a message comprising configuration information on multicast and broadcast service (MBS) and configuration information on at least one reference signal associated with the MBS, and receive, from the terminal, a measurement report associated with the MBS comprising a measurement result of the at least one reference signal associated with the MBS based on the configuration information on the at least one reference signal associated with the MBS, wherein a timing associated with transmitting the measurement report is determined based on a discontinuous reception (DRX) on duration time of a unicast and a DRX timing of the MBS.

14. The base station of claim 13, wherein the message comprises a radio resource control (RRC) reconfiguration message, and wherein the at least one reference signal comprises at least one of a channel state information reference signal (CSI-RS) or a demodulation reference signal (DMRS).

15. The base station of claim 13, wherein the measurement report associated with the MBS further comprises a measurement result of at least one reference signal associated with a unicast.

16. The base station of claim 13, wherein the controller is further configured to:

transmit, to the terminal, a data associated with the MBS in a downlink bandwidth part (DL BWP), wherein in case that a timer associated with the downlink bandwidth part expires and a default DL BWP associated with the MBS is configured, the DL BWP is switched to the default DL BWP, and wherein in case that the timer associated with the downlink bandwidth part expires and the default DL BWP associated with the MBS is not configured, the DL BWP is switched to an initial DL BWP.

* * * * *